United States Patent [19]

Takahashi

[11] Patent Number: 5,068,741
[45] Date of Patent: Nov. 26, 1991

[54] IMAGE OUTPUT APPARATUS FOR REPRODUCING, ADJACENT EACH OTHER, LEADING IMAGE DATA PORTIONS OF PLURAL IMAGE UNITS

[75] Inventor: Masatomo Takahashi, Kawasaki, Japan

[73] Assignee: Canon Kabushiki Kaisha, Tokyo, Japan

[21] Appl. No.: 412,605

[22] Filed: Sep. 26, 1989

Related U.S. Application Data

[63] Continuation of Ser. No. 117,415, Nov. 2, 1987, abandoned, which is a continuation-in-part of Ser. No. 704,934, Feb. 25, 1985, abandoned.

[30] Foreign Application Priority Data

Feb. 29, 1984 [JP] Japan .................................. 59-36301
Feb. 29, 1984 [JP] Japan .................................. 59-36302

[51] Int. Cl.⁵ ...................... H04N 1/21; H04N 1/23; G06F 3/12
[52] U.S. Cl. .................................... 358/296; 358/444; 358/450; 358/453; 358/462; 395/101
[58] Field of Search .............. 358/296, 401, 405, 444, 358/450, 453, 462; 364/518, 523; 340/789, 799, 721

[56] References Cited

U.S. PATENT DOCUMENTS

| | | | |
|---|---|---|---|
| 4,352,100 | 9/1982 | O'Connell | 340/734 X |
| 4,426,653 | 1/1984 | Komada | 358/288 X |
| 4,437,127 | 3/1984 | Hirose | 358/296 |
| 4,438,459 | 5/1984 | Levine | 355/14 CX |
| 4,538,183 | 8/1985 | Kanno | 364/523 |
| 4,580,171 | 4/1986 | Arimoto | 358/287 |
| 4,591,997 | 5/1986 | Grabel | 358/296 X |

OTHER PUBLICATIONS

*CPT 8500 Series Reference Manual*, World Headquarters CPT Corporation: Minnesota, 1983, pp. 4–22 to 4–24.

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

An image output apparatus having a memory which stores image data corresponding to a plurality of pages. A record control unit controls the output device so as to sequentially output the leading portions of the stored image data respectively corresponding to the plurality of pages.

12 Claims, 4 Drawing Sheets

IMAGE OUTPUT APPARATUS FOR REPRODUCING, ADJACENT EACH OTHER, LEADING IMAGE DATA PORTIONS OF PLURAL IMAGE UNITS

This application is a continuation of application Ser. No. 117,415 filed Nov. 2, 1987, which is a continuation of parent application Ser. No. 704,934 filed Feb. 25, 1985, now abandoned.

BACKGROUND OF THE INVENTION

1. Field of the Invention

The present invention relates to an image output apparatus which transmits, displays and records images, and more particularly to an image output apparatus which includes memory means to store the image data.

2. Description of the Prior Art

Image output apparatuses, e.g., recent facsimile apparatus, which have a function to store the read data of images into a memory have increased in number. In prior art apparatus having such functions, a user either cannot see the contents of the memory, i.e., the stored original document data, or must record all the data of images contained in one page of recording paper if he needs to see the image data as occasion demands, for example for the purpose of confirmation.

For this reason, if the stored contents require a great number of pages to be printed out, the operation of only seeing the data requires a great amount of time, as well as requiring a large number of sheets of recording paper on which data is recorded for reference purposes only.

SUMMARY OF THE INVENTION

It is therefore an object of the present invention to provide an image output apparatus which eliminates the above drawback.

It is another object of the present invention to provide an image output apparatus in which the contents of an image memory can be seen in a short time.

It is still another object of the present invention to provide an image output apparatus which requires a reduced amount of sheets of recording paper on which the image data of the memory is output for reference purposes.

The above and other objects, features and advantages of the present invention will be apparent from the following description of preferred embodiments thereof, taken in conjunction with the accompanying drawings.

DETAILED DESCRIPTION OF THE PREFERRED EMBODIMENTS

Now, the present invention will be described in more detail in terms of the embodiments thereof in conjunction with the drawings.

Figure 1:
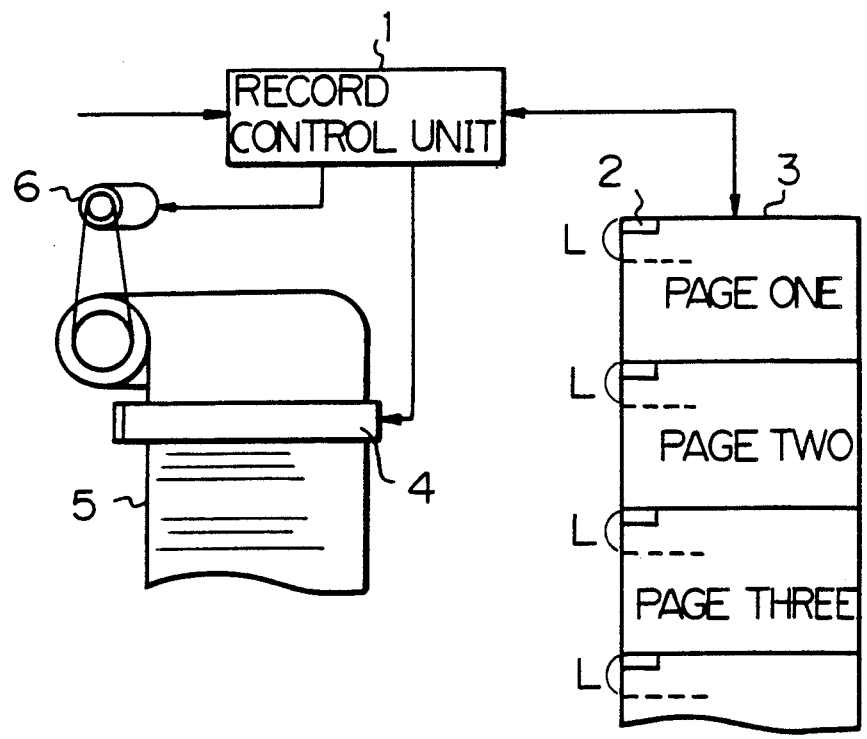
FIG. 1 is a schematic view of illustrating the structure of a first embodiment of an image output apparatus according to the present invention.
Figure 3:
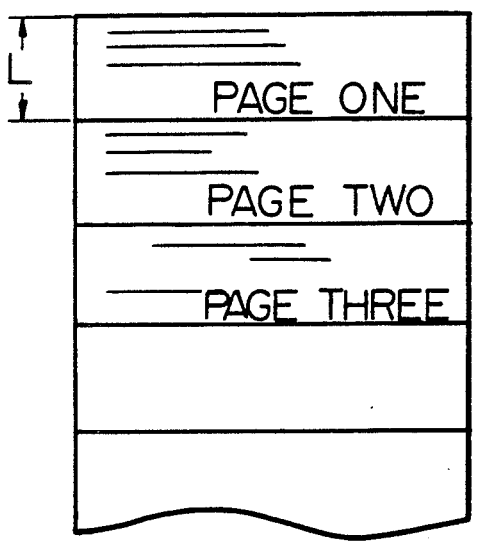
FIG. 3 illustrates an example of output records according to the first embodiment.
Figure 2:
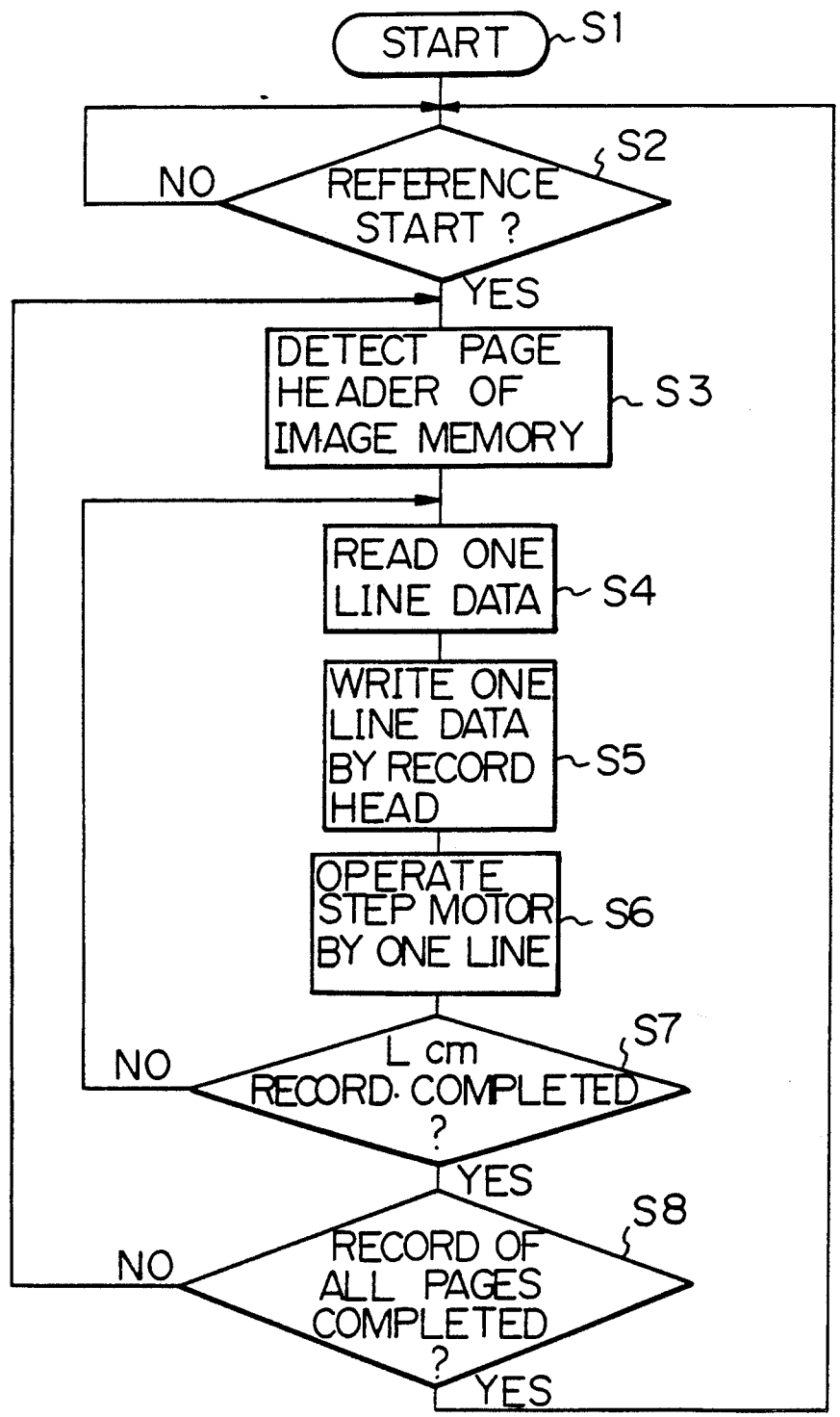
FIG. 2 is a flowchart illustrating the operation of the embodiment of FIG. 1.

FIGS. 1 to 3 illustrate a first embodiment, which is directed to a facsimile apparatus, of the present invention. In the figure, reference numeral 1 denotes a record control unit which receives image data, adds a header 2 to each page and stores the image data of each page into an image memory 3.

In order to record the image data within the image memory 3, the record control unit 1 reads the image data out of the memory 3, sends it to a recording head 4, causing it to record one line on recording paper 5, and then causes stepping motor 6 to feed the recording paper by a predetermined amount. The recording paper can be supplied from a roll, for example.

The operation of the particular embodiment, as constituted as above, will be described with respect to the flowchart of FIG. 2.

At a step S1, the facsimile apparatus starts. At a step S2, it is determined whether or not reading of the image data from the memory 3 for reference purposes should be started.

If reference to the recorded data starts, control passes to a step S3 and if otherwise, passing to the next step is reserved until the reference starts.

At the step S3, when the image data is received, the headers, each of which is added to a corresponding page is sensed and the beginning portion of the data on each page is read. Then control passes to a step S4 where data for one line is read. At a step S5, the data for that line is then recorded.

Thereafter, control passes to a step S6 where feeding of recording paper is performed by the stepping motor by an amount corresponding to one line. These operations are repeated until recording for a predetermined length L cm is completed at a step S7.

After the L-cm recording is completed, the data on the next page is read and a milar L-cm recording is completed, the data on the next page is read and a similar L-cm recording is performed. At a step S8, similar operations are repeated for all the pages. Then, as shown in FIG. 3, after recording for all the pages is completed, control returns to the step S2 for awaiting the next operations.

As described above, the particular embodiment is arranged to record the beginning portion of each page, so that a time and an amount of recording paper required for recording the data for reference purposes are greatly conserved.

In the particular embodiment, the length of recording is shown as being L cm, but the user can set this length to any desired value.

Figure 4:
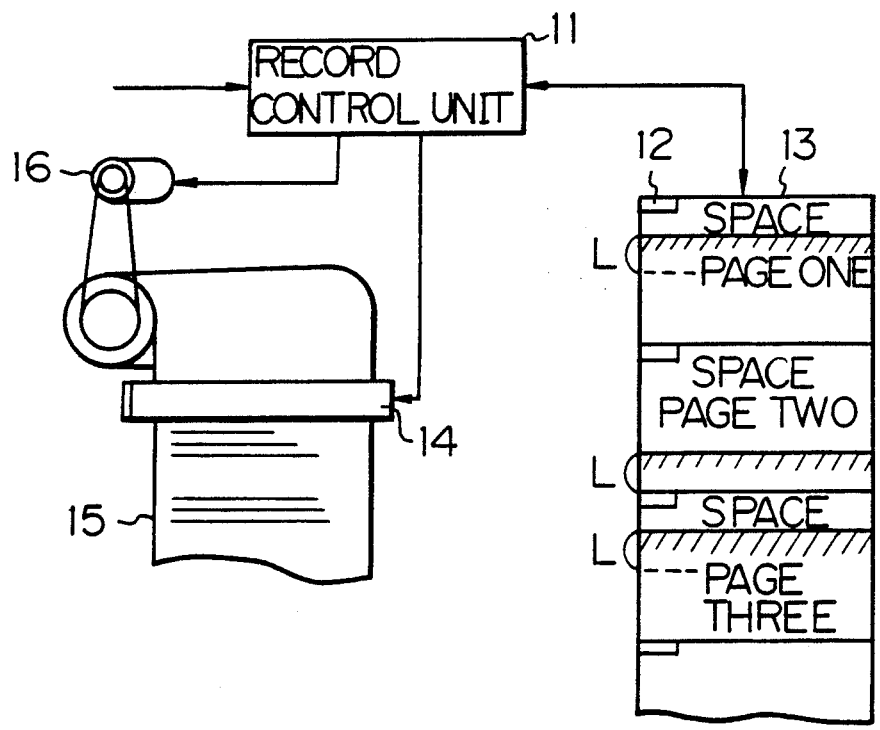
FIG. 4 is a schematic view of the structure of a second embodiment of the invention.

Now, the second embodiment of the present invention will be described with respect to FIG. 4 and the following figures. In the figures, reference numeral 11 denotes a record control unit which receives the data of an image, adds a header 12 to and stores the data in an image memory 13.

When the image data in the memory 13 is to be recorded, the image data is read from the memory 13, the read data is sent to a recording head 14 which then records one line on a recording paper 15, and a stepping motor 16 then feeds the recorded paper by an amount corresponding to one line under control of the record control unit 11.

Figure 5:
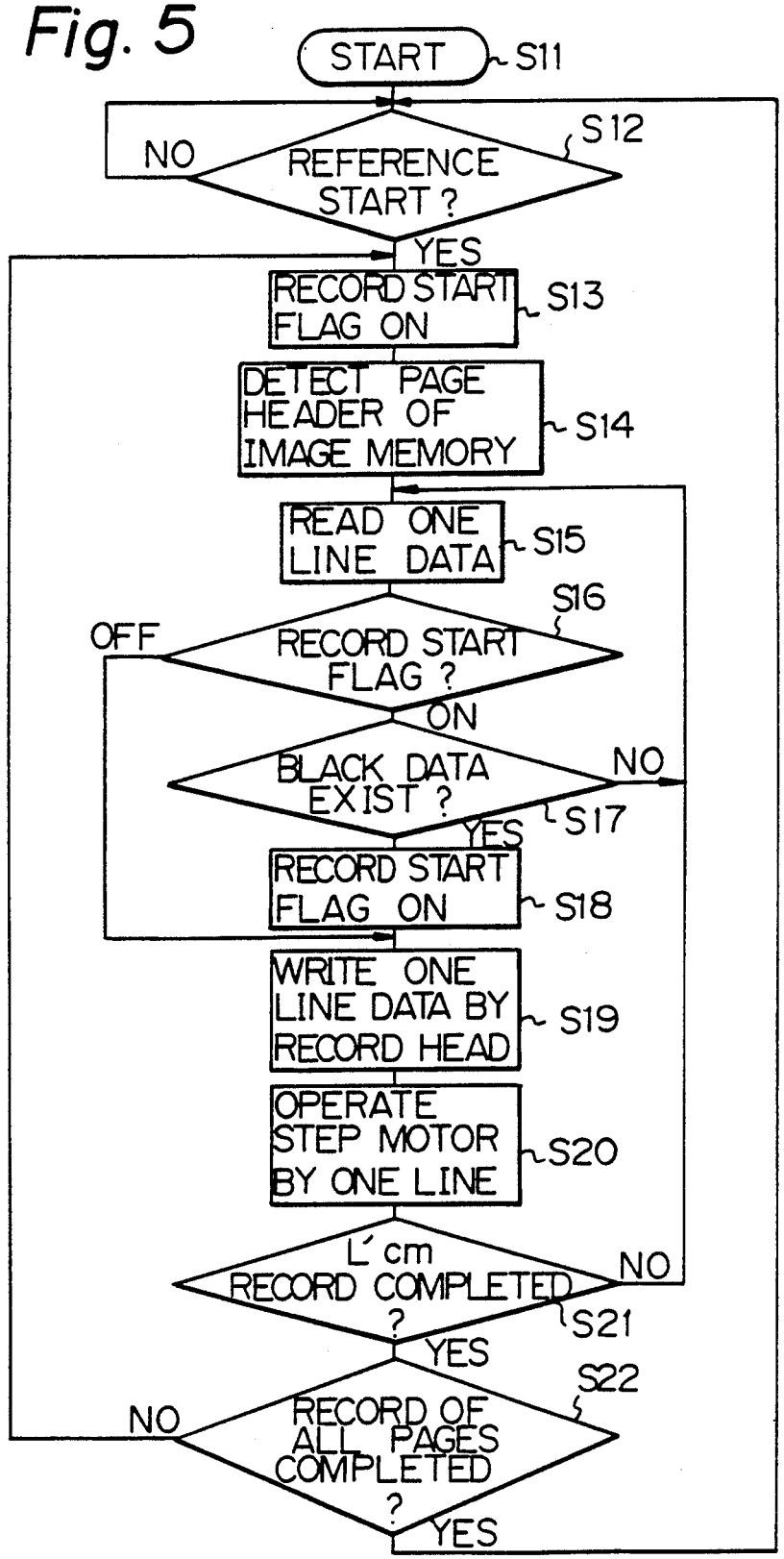
FIG. 5 is a flowchart illustrating the operation of the second embodiment shown in FIG. 4.

The operation of the second embodiment, in more detail, a process for taking the once stored image data out of the memory 13 and referring to the data, will be described with respect to the flowchart of FIG. 5.

First, at a step S11, the facsimile apparatus is put in a condition prepared to start record operation.

At a step S12, it is determined whether or not the operation of taking the recorded data out of the memory 13 for reference purposes should be started. If reference to the data is started, then control passes to a step S13 and if otherwise, passing to the step S13 is reserved until reference starts at the step S11.

At the step S13, a record start flag is set to 1(ON). The meaning of this flag will be described later.

Then control passes to a step S14 where when the image data is received by the record control unit, the page headers, each of which is added to a corresponding page, are sensed and the respective beginning of each page is performed.

Thereafter, at a step S15, a first line of the image data is read.

Then at a step S16, it is determined whether or not the record start flag is set to 1. When the first line of the image data is read, the flag is set to 1 so that control passes to a step S17.

At the step S17, it is determined whether or not some image is recorded in the currently read line or the first line, or whether or not there is black data in that line. If there is no black data or the line is empty, control returns to the step S15. If there is black data or the line is not empty, control passes to a step S18 where the record start flag is set to 0(OFF).

As will be apparent from the above, when empty lines continue from the beginning of a page, the flag continues to be set to 1 until a line which is not empty appears at which time the flag is set to 0.

When a line which is not empty appears, control passes, via steps S17 and S18, to S19 where the image data is sent to the recording head 13 and printing for one line is performed on recording paper 15.

At a step S20, record-control until 11 instructs the stepping motor 14 to feed the recording paper 15 by an amount corresponding to one-line recording.

Then at a step S21, it is determined whether or not the number of lines corresponding to a predetermined L′ cm has been recorded. If no record for L′ cm has been recorded yet, control returns to the step S15. If otherwise, control passes to a step S22.

When it is determined at the step S15 that the recording for L′ cm has not been completed, the steps S15 and S16 are repeated once more. However, since control has already passed through the step S18, the record start flag has been set to 0. Consequently, control jumps from the step S16 directly to the step S19 and hence via the steps S20 and S21 back to the step S15, which steps are repeated until recording for L′ cm has been completed.

When recording for L′ cm of part of an image on a page has been completed, control passes to the step S22. Thus, steps S13-S21 are repeated until recording for L′ cm of each of all the pages has been completed.

At the time of completing the above operations, control returns to the initial state, i.e., reference start awaiting state, at which the step S12 is not executed, thereby completing operation.

Figure 6:
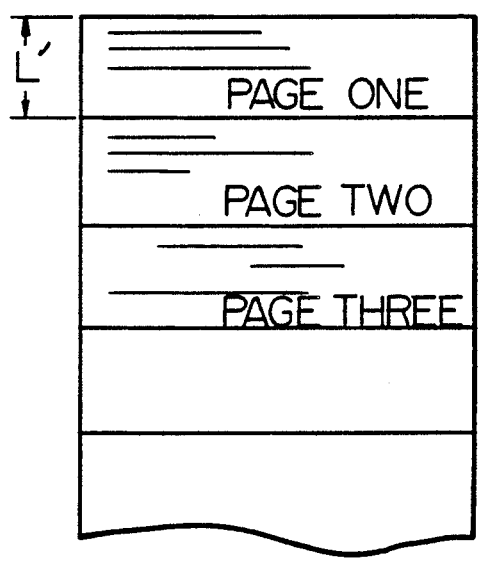
FIG. 6 is a view for explaining an example of output records.

According to this second embodiment, as constructed above, arrays of image elements, each array being for L′ cm and starting with a line in which the image begins to appear, are serially recorded through all the pages, as shown in FIG. 6. This brings about great reduction of a time required for recording the image data for reference purposes and of a time required for reference to the contents of the image data.

In the second embodiment, the recording length is shown as being L′ cm, but it can be changed to any desired value by the user.

As is apparent from the above, the present invention is arranged such that part of the image data on each page is printed as the output of the memory, thereby allowing efficient reference to the data in the memory.

In addition, simple operation of printing image data for a desired number of successive lines, in the first of which the first useful information of the image on each page appears brings about efficient reference to the image data in the memory.

In the embodiments, the beginning portion of image data on each page is shown as being output on recording paper, but may be displayed on a display, of course, in which case, reduced display space is required.

Furthermore, in addition to the above-described embodiments, various changes and modifications which are obvious to a person skilled in the art to which the present invention pertains are deemed to lie within the spirit and scope of the invention.

What I claim is:

1. An image output apparatus comprising:
   an image memory for storing image data corresponding to a plurality of unit images, the image data of each unit image including a leading portion;
   readout means for reading out the image data stored in said image memory;
   control means for controlling said readout means such that said readout means sequentially reads out a part of the image data of each unit image from said image memory; and
   reproduction means for reproducing, adjacent each other, parts of respective unit images of the image data read out by said control means through said readout means such that these parts can be displayed simultaneously,
   wherein said control means controls said readout means so as to read out the leading portion of the image data of each unit image.

2. An image output apparatus according to claim 1, wherein said control means controls said readout means so as to read out the leading portion of useful information contained in the image data of each unit image.

3. An image output apparatus according to claim 1, wherein said reproduction means includes recording means for recording the image on a recording material.

4. An image output apparatus according to claim 3, wherein said recording material is supplied from a roll.

5. An image output apparatus comprising:
   an image memory for storing image data corresponding to a plurality of pages;
   readout means for reading out the image data stored in said image memory;
   control means for controlling said readout means so as to sequentially read out from said image memory the image data corresponding to a predetermined number of lines smaller than the total number of lines of each page; and
   reproduction means for reproducing, adjacent each other, the predetermined number of lines of the plurality of pages corresponding to the image data read out by said control means through said readout means such that these lines can be displayed simultaneously.

6. An image output apparatus according to claim 5 wherein said control means controls said reproduction means so as to reproduce the image data by the predetermined number of lines from the beginning of each page.

7. An image output apparatus according to claim 5, wherein said control means controls said reproduction means so as to reproduce the image data by the predetermined number of lines from the beginning of useful information of each page.

8. An image output apparatus according to claim 5, wherein said reproduction means includes recording means for recording the image on a recording material.

9. An image output apparatus according to claim 8, wherein said recording material is supplied from a roll.

10. An image output apparatus comprising:
 an image memory for storing image data corresponding to a plurality of pages;
 readout means for reading out the image data stored in said image memory;
 detection means for detecting black data contained in the image data stored in said image memory;
 control means for controlling said readout means so as to read out from said image memory a part of the image data corresponding to a part of useful information in accordance with a detection result of said detection means; and
 reproduction means for reproducing, adjacent each other, the parts of the useful information of the plurality of pages corresponding to the image data readout by said control means through said readout means.

11. An image output apparatus according to claim 10, wherein said control means controls said readout means so as to read out the leading portion of the useful information contained in the image data of each page.

12. An image output apparatus according to claim 11, wherein said control means controls said reproduction means so as to reproduce the image data by the predetermined number of lines from the beginning of useful information of each page.

* * * * *

UNITED STATES PATENT AND TRADEMARK OFFICE
CERTIFICATE OF CORRECTION

PATENT NO. : 5,068,741                  Page 1 of 2

DATED : November 26, 1991

INVENTOR(S) : MASATOMO TAKAHASHI

It is certified that error appears in the above-indentified patent and that said Letters Patent is hereby corrected as shown below:

On the Title Page:

At [63] Related U.S. Application Data:
    "continuation-in-part" should read --continuation--.

COLUMN 1:
    Line 45, "amount" should read --number--; and
    Line 55, "of" should be deleted COLUMN 2:
    Line 42, "milar L-cm recording is" should be deleted; and
    Line 43, "completed, the data on the next page is read and a" should be deleted.

UNITED STATES PATENT AND TRADEMARK OFFICE
CERTIFICATE OF CORRECTION

PATENT NO. : 5,068,741  Page 2 of 2
DATED : November 26, 1991
INVENTOR(S) : MASATOMO TAKAHASHI It is certified that error appears in the above-indentified patent and that said Letters Patent is hereby corrected as shown below:

<u>COLUMN 3</u>:

Line 38, "appears" should read --appears,--.

Signed and Sealed this

Eighth Day of June, 1993

Attest:

MICHAEL K. KIRK

Attesting Officer    Acting Commissioner of Patents and Trademarks